United States Patent
Hiroe et al.

(10) Patent No.: US 11,537,158 B2
(45) Date of Patent: Dec. 27, 2022

(54) CONTROL APPARATUS, CONTROL METHOD, AND NON-TRANSITORY COMPUTER READABLE MEDIUM

(71) Applicant: MITSUBISHI HEAVY INDUSTRIES, LTD., Tokyo (JP)

(72) Inventors: Takaharu Hiroe, Tokyo (JP); Kazunari Ide, Tokyo (JP); Ryo Sase, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 231 days.

(21) Appl. No.: 16/944,545

(22) Filed: Jul. 31, 2020

(65) Prior Publication Data
US 2021/0064072 A1 Mar. 4, 2021

(30) Foreign Application Priority Data
Sep. 3, 2019 (JP) .............. JP2019-160565

(51) Int. Cl.
*H02P 9/04* (2006.01)
*G05F 1/66* (2006.01)
*G05F 1/247* (2006.01)

(52) U.S. Cl.
CPC .............. *G05F 1/66* (2013.01); *G05F 1/247* (2013.01); *H02P 9/04* (2013.01)

(58) Field of Classification Search
CPC ............ G05F 1/66; G05F 1/247; H02P 9/04
See application file for complete search history.

(56) References Cited

U.S. PATENT DOCUMENTS

2020/0059181 A1* 2/2020 Deng .............. H02P 29/50

FOREIGN PATENT DOCUMENTS

| JP | 11-206195 | 7/1999 |
|---|---|---|
| JP | 11-252998 | 9/1999 |
| JP | 2000-170548 | 6/2000 |
| JP | 2002-228103 | 8/2002 |
| JP | 2003-65079 | 3/2003 |
| JP | 4034397 | 1/2008 |
| JP | 4069309 | 4/2008 |
| JP | 2014-194174 | 10/2014 |
| JP | 6043543 | 12/2016 |

* cited by examiner

*Primary Examiner* — Viet P Nguyen
(74) *Attorney, Agent, or Firm* — Wenderoth, Lind & Ponack, L.L.P.

(57) ABSTRACT

A control apparatus 20 that is configured to control driving of a power generation apparatus including a motor and a power generator, the control apparatus including a processor 200 executing: a process of calculating a first adjustment force command value used for controlling the motor in accordance with a deviation between an observed value and a reference value of a rotation speed of the power generator; a process of calculating a correction value for compensating for a delay of an electric output of the power generator; and a process of calculating a correction value for compensating for a delay of an electric output of the power generator; and a process of calculating a second adjustment force command value used for controlling the motor by adding the first adjustment force command value and the correction value.

8 Claims, 9 Drawing Sheets

CONTROL APPARATUS, CONTROL METHOD, AND NON-TRANSITORY COMPUTER READABLE MEDIUM

BACKGROUND OF THE INVENTION

Field of the Invention

The present invention relates to a control apparatus, a control method, and a non-transitory computer readable medium. Priority is claimed on Japanese Patent Application No. 2019-160565, filed Sep. 3, 2019, the content of which is incorporated herein by reference.

Description of Related Art

In a power system, a power plant performs governor-free driving in accordance with a power demand and adjusts a power generation output so that the frequency of a power transmission and distribution system is maintained. Power demands of an office, a factory, a general home, and the like vary at every moment. When a power demand of a power transmission and distribution system exceeds a power supply, the frequency of the power transmission and distribution system becomes lower than a reference value (for example, 50 Hz or 60 Hz). On the other hand, when a power supply exceeds a power demand, the frequency becomes higher than the reference value. A power plant adjusts generated power in accordance with a frequency such that a supply is balanced with a demand varying at every moment, and in a case in which adjustment is ideally performed, the frequency coincides with a reference value.

It is known that a long-period power oscillation over two seconds occurs in a power system. For this reason, for example, in Patent Document 1, it is described that long-period oscillations are damped by installing a power system stabilizer (PSS) to correct a voltage command for a power generator.

PATENT DOCUMENTS

[Patent Document 1] Japanese Unexamined Patent Application, First Publication No. H11-206195

SUMMARY OF THE INVENTION

However, a cost is incurred in the installation of the PSS, and thus measures for reducing costs are further requested. In addition, as power oscillations, there are a plurality of modes such as short-period oscillations depending on power generator-specific characteristics in addition to long-period oscillations. Therefore, the PSS needs to have a setting value for each mode of power oscillations, and complicated operations are required for the introduction and the operation thereof.

The present disclosure is in view of such a problem and provides a control apparatus, a control method, and a non-transitory computer readable medium capable of inhibiting long-period oscillations of a power system by employing a simple configuration.

In order to solve the problems described above, a control apparatus according to one aspect of the present disclosure is a control apparatus that is configured to control driving of a power generation apparatus including a motor and a power generator, the control apparatus including a processor executing: a process of calculating a first adjustment force command value used for controlling the motor in accordance with a deviation between an observed value and a reference value of a rotation speed of the power generator; a process of calculating a correction value for compensating for a delay of an electric output of the power generator; and a process of calculating a second adjustment force command value used for controlling the motor by adding the first adjustment force command value and the correction value.

In addition, a control apparatus according to one aspect of the present disclosure is a control apparatus that is configured to control driving of a solar power generation apparatus that performs power generation using a solar cell, the control apparatus including a processor executing: a process of predicting a response of an electric output of the solar cell on the basis of observed values of the electric output and an angular frequency of the solar cell; and a process of calculating a correction value used for adjusting a voltage target value of the solar cell on the basis of a deviation between the observed value of the electric output and the predicted response.

In addition, a control apparatus according to one aspect of the present disclosure is a control apparatus that is configured to control driving of a load apparatus to which electric power is supplied from a power system, the control apparatus including a processor executing: a process of calculating a correction value for the electric power supplied to the load apparatus that corresponds to the additional electric output requested by the power system; and a process of calculating a correction value used for adjusting a voltage target value of the supplied electric power on the basis of the correction value for the supplied electric power.

In addition, a control apparatus according to one aspect of the present disclosure is a control apparatus that is configured to control on/off of supply of electric power from a power system to a plurality of load apparatuses, the control apparatus including a processor executing: a process of calculating a correction value for the electric power supplied to each load apparatus that corresponds to an additional electric output requested by the power system; a process of switching the supply of the electric power to the load apparatus on or off on the basis of the correction value for the supplied electric power and a threshold; and a process of changing the threshold using a random number.

In addition, a control apparatus according to one aspect of the present disclosure is a control apparatus that corrects an adjustment force of a power generation apparatus individually disposed in a plurality of power plants, the control apparatus including a processor executing: a process of calculating a correction value for compensating for a delay of an electric output of a power generator included in each of the plurality of power generation apparatuses and for adjusting an output of a motor included in each of the plurality of power generation apparatuses; and a process of outputting the correction value to each of the plurality of power generation apparatuses.

In addition, a control method according to one aspect of the present disclosure is a control method for controlling driving of a power generation apparatus including a motor and a power generator, the control method including: calculating a first adjustment force command value used for controlling the motor in accordance with a deviation between an observed value and a reference value of a rotation speed of the power generator; calculating a correction value for compensating for a delay of an electric output of the power generator; and calculating a second adjustment force command value used for controlling the motor by adding the first adjustment force command value and the correction value.

In addition, a non-transitory computer readable medium according to one aspect of the present disclosure stores a program that enables a computer of a control apparatus controlling driving of a power generation apparatus including a motor and a power generator to function, the program causing the computer to execute: a process of calculating a first adjustment force command value used for controlling the motor in accordance with a deviation between an observed value and a reference value of a rotation speed of the power generator; a process of calculating a correction value for compensating for a delay of an electric output of the power generator; and a process of calculating a second adjustment force command value used for controlling the motor by adding the first adjustment force command value and the correction value.

According to a control apparatus according to any one aspect of the present disclosure, long-period oscillations of a power system can be inhibited by employing a simple configuration.

DETAILED DESCRIPTION OF THE INVENTION

First Embodiment

Hereinafter, a control apparatus 20 of a power adjustment system 1 according to a first embodiment of the present invention will be described with reference to FIGS. 1 to 3.
(Entire Configuration of Power Adjustment System)

Figure 1:
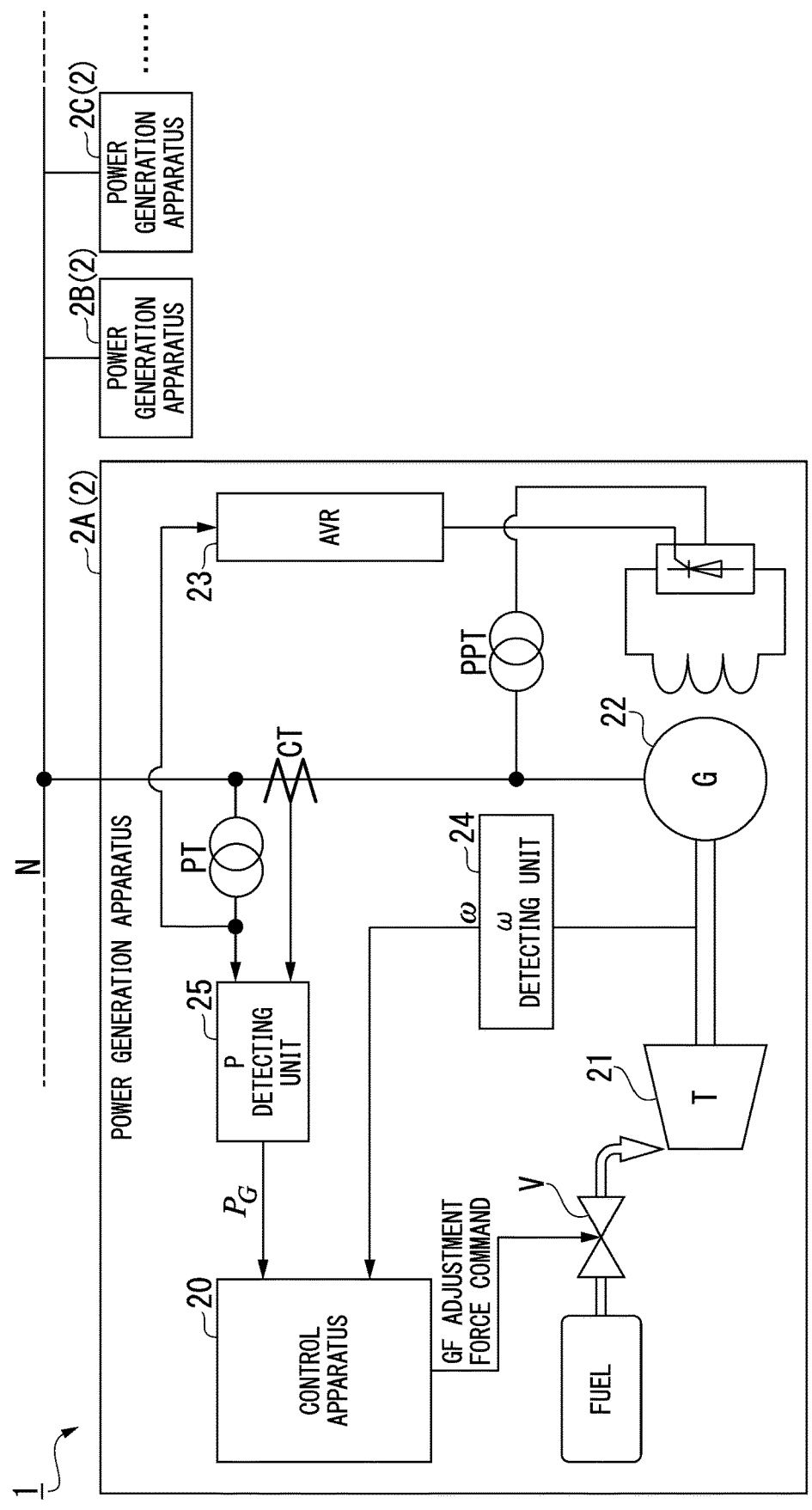
FIG. 1 is a diagram illustrating the entire configuration of a power adjustment system according to a first embodiment.

FIG. 1 is a diagram illustrating the entire configuration of the power adjustment system according to the first embodiment.

As illustrated in FIG. 1, the power adjustment system 1 adjusts electric power supplied to a power system using a plurality of power generation apparatuses 2A, 2B, 2C, . . . . In the following description, the plurality of power generation apparatuses 2A, 2B, 2C, . . . will be collectively referred to as a power generation apparatus 2. The power generation apparatus 2 is a power generation apparatus disposed in a power plant using thermal power, atomic power, wind power, solar light, or the like and includes a control apparatus 20, a turbine apparatus 21 (a motor), a power generator 22, and an automatic voltage regulator (AVR) 23.

The turbine apparatus 21, for example, is a motor such as a gas turbine, a steam turbine, a water turbine, or a diesel engine and generates a torque corresponding to the amount of supply. The turbine apparatus 21 rotates and drives the power generator 22 through a rotation shaft connected to the power generator 22.

The power generator 22 generates electric power by rotating a rotor using a torque input from the turbine apparatus 21. Electric power generated by the power generator 22 is transmitted to a power transmission line N.

The AVR 23 measures an output voltage of the power generator 22 through an instrument transformer PT and adjusts a field current supplied to the power generator 22 such that an output voltage of the power generator 22 becomes constant.

The control apparatus 20 performs drive control of the power generation apparatus 2. Particularly, the control apparatus 20 constantly monitors a rotation speed (angular velocity) of the power generator 22 through an ω detecting unit 24 and automatically adjusts an input amount (an amount of fuel supply) for the turbine apparatus 21 such that the rotation speed becomes constant (governor-free driving). More specifically, the control apparatus 20 acquires an observed value ω of the rotation speed of the power generator 22 through the w detecting unit 24 and acquires an observed value $P_G$ of electric power (active power) output from the power generator 22 to the power transmission line N through a P detecting unit 25. Then, the control apparatus 20 calculates an output (a GF adjustment force) to be further generated by the power generator 22 on the basis of the observed value w of the rotation speed of the power generator 22 and the observed value $P_G$ of an electric output of the power generator 22. The control apparatus 20 outputs a GF adjustment force command (a valve opening degree command) representing a calculated GF adjustment force to a governor V (fuel or steam supply valve).

The turbine apparatus 21 realizes an additional output using the power generator 22 by opening/closing the governor V that adjusts an output of the turbine apparatus 21 on the basis of a GF adjustment force command output from the control apparatus 20.
(Functional Configuration of Control Apparatus)

Figure 2:
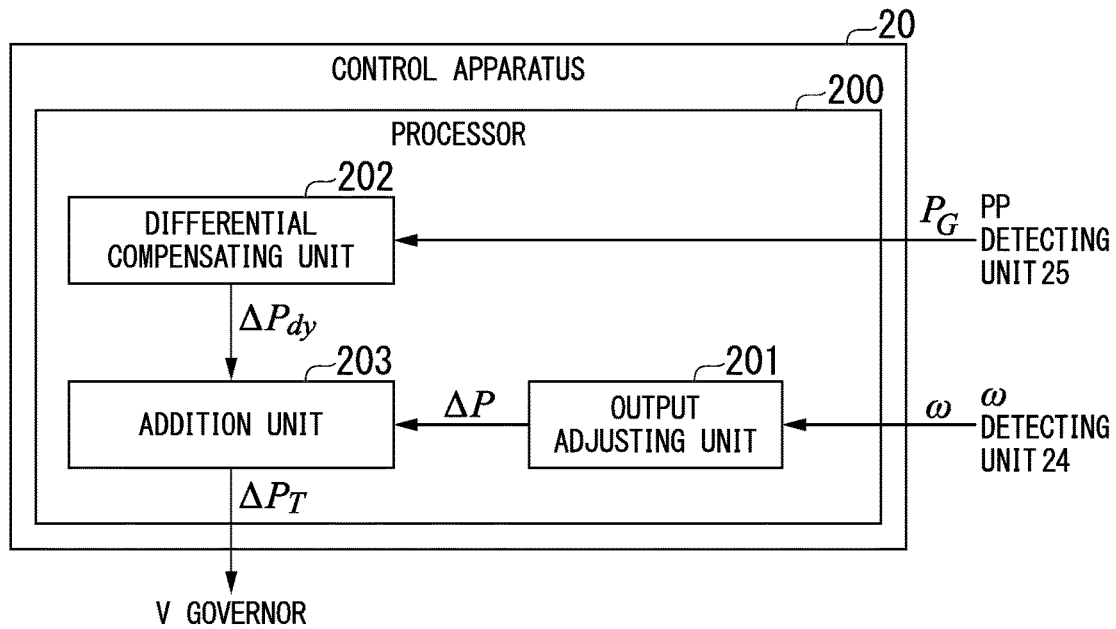
FIG. 2 is a diagram illustrating the functional configuration of a control apparatus according to the first embodiment.

FIG. 2 is a diagram illustrating the functional configuration of the control apparatus according to the first embodiment.

As illustrated in FIG. 2, the control apparatus 20 includes a processor 200. The processor 200 exhibits the function of each functional unit by operating in accordance with a program. In this embodiment, the control apparatus 20 includes an output adjusting unit 201, a differential compensating unit 202, and an addition unit 203 as functional units.

The output adjusting unit 201 calculates an output (a first adjustment force command value ΔP) to be additionally generated by the power generation apparatus 2 in accordance with a deviation (a frequency shift Δω) between an observed value of the rotation speed of the power generator 22 and a reference value in governor-free driving performed by the control apparatus 20.

The differential compensating unit 202 calculates a correction value $\Delta P_{dy}$ used for compensating for a delay of the electric output of the power generator 22. More specifically, the differential compensating unit 202 calculates a differential signal, which is acquired by differentiating an observed value of the electric output of the power generator 22 (also simply referred to hereinafter as an "electric output $P_G$") that is acquired through the P detecting unit 25, as a correction value $\Delta P_{dy}$.

The addition unit 203 calculates a second adjustment force command value $\Delta P_T$ by adding the first adjustment force command value ΔP calculated by the output adjusting unit 201 and the correction value $\Delta P_{dy}$ calculated by the differential compensating unit 202. The second adjustment force command value $\Delta P_T$ is output to the governor V as a final GF adjustment force command (a valve opening degree command) of the control apparatus 20.

(Operation/Effect)

Each unit of the processor 200 of the control apparatus 20 inhibits long-period oscillations in a power system by repeatedly executing the processes illustrated in FIG. 2. Here, operations and effects of the control apparatus 20 will be described specifically.

First, the first adjustment force command value ΔP calculated by the output adjusting unit 201 is represented as in Equation (1) using a droop coefficient δ.

$$\Delta P = \frac{P_{Gn}}{\delta} \frac{\Delta \omega}{\omega_n} \quad (1)$$

In Equation (1) represented above, "$\omega_n$" is a reference angular velocity [rad/s] of the power system, and "$P_{Gn}$" is a rated output [W] of the power generation apparatus 2. In addition, "Δω" is acquired by subtracting an actual angular velocity ω (an observed value of the rotation speed that is acquired by the ω detecting unit 24) from the reference angular velocity con. When the actual angular velocity ω exceeds the reference angular velocity $\omega_n$, Δω has a negative value.

When a moment of inertia [kgm²] of the power generator 22 including the turbine apparatus 21 with respect to the electric angular velocity ω is denoted by "J," an electric output [W] of the power generator 22 is denoted by "$P_G$," and an output [W] of the turbine apparatus 21 including the GF adjustment force ΔP is denoted by "$P_T$," the rotary motion of the power generator 22 is represented as in the following Equation (2).

$$J\dot{\omega}\omega = (P_T + P_G) \quad (2)$$

Here, the electrical angle [rad] of the power generator 22 is denoted by "q." By redefining "q" as a deviation from a stabilization point using the stabilization point of the electrical angle as the origin in rated driving of the power generator 22 and performing linear approximation of Equation (2) represented above, the following Equation (3) is acquired.

$$\omega_n J\ddot{q} + D\dot{q} + Kq = 0 \quad (3)$$

In Equation (3) represented above, "D" is damping (a damping coefficient) and can be represented using Equation (4). In addition, "K" is a spring constant of a vibration model and can be represented using Equation (5).

$$D = P_{Gn}\delta^{-1} \quad (4)$$

$$K = -\partial P_G / \partial q \quad (5)$$

This motion is a secondary vibration system, and thus by appropriately setting the value of "D," a vibration can be damped in principle. However, it is known that long-period oscillations having a period of over two seconds actually occur in a power system.

Figure 3:
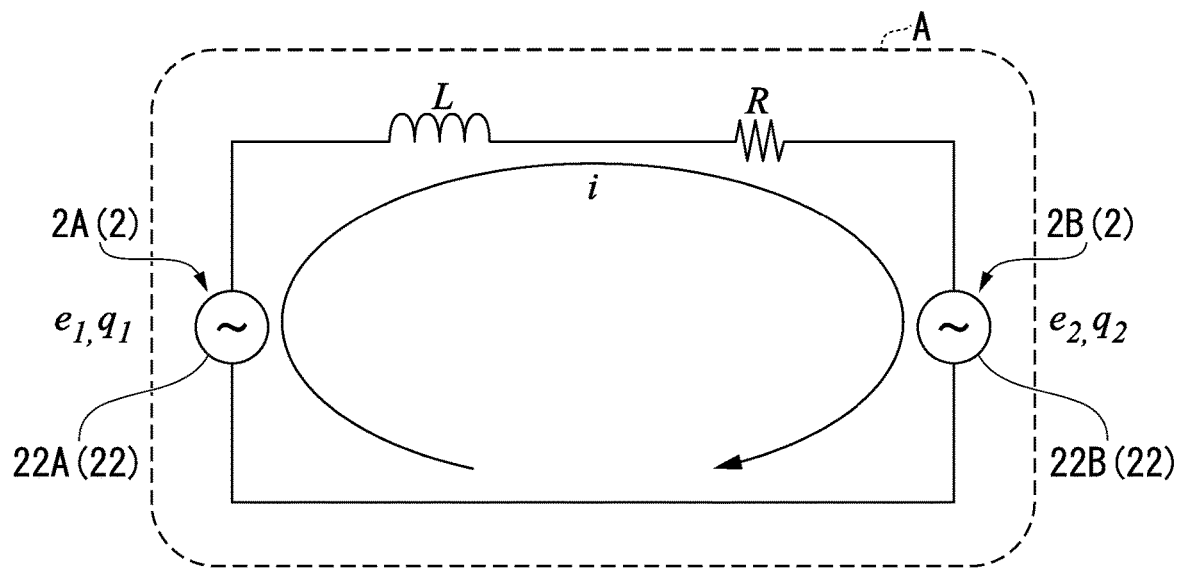
FIG. 3 is a diagram illustrating an example of a power system model according to the first embodiment.

FIG. 3 is a diagram illustrating an example of a power system model according to the first embodiment.

In a long-period oscillation, for example, a frequency of a power system, like a seesaw, vibrates with opposite phases on both sides of an area A of which a reference frequency is 60 Hz. FIG. 3 illustrates a model in which two power generators 22A and 22B are placed at both ends of the area A. Actually, although a large number of power generators 22 (more than two power generators) are disposed in an area A, a seesaw-shaped vibration is simplified to two power generators 22A and 22B in the model illustrated in FIG. 3. In FIG. 3, the motion of each of the power generators 22A and 22B around a stabilization point is represented in the following Equation (6).

$$\begin{cases} \omega_n J\ddot{q}_1 + D\dot{q}_1 + Kq_1 = 0 \\ \omega_n J\ddot{q}_2 + D\dot{q}_2 + Kq_2 = 0 \end{cases} \quad (6)$$

"$q_1$" and "$q_2$" represented in Equation (6) above are electrical angles of the power generators 22A and 22B, and, when a phase difference thereof is denoted by "$q = q_1 - q_2$," a seesaw-shaped vibration can be represented in the following Equation (7).

$$\tfrac{1}{2} \cdot \omega_n J\ddot{q} + D\dot{q} + Kq = 0 \quad (7)$$

In this way, the damping of a vibration is dominated clearly by "D." "D" can be adjusted using a droop coefficient δ, and thus a long-period oscillation can be avoided when the value of the droop coefficient δ is appropriate. However, as described above, it is known that long-period oscillations having a period of over two seconds actually occur in a power system. As will be described below, the reason for this is considered to be an electrical response of the power transmission line N being delayed in long-distance power transmission.

In the model of the power system as illustrated in FIG. 3, generally, a winding of each of the power generators 22A and 22B and a power transmission line N connecting these windings are simply represented as impedance for the reference angular velocity $\omega_n$, in other words, "$R + j\omega_n L$." When complex vectors of induced electromotive forces [V] of the power generators 22A and 22B disposed at both ends of the area A are respectively denoted by "e1" and "e2," a complex vector of a current i [A] can be represented using the following Equation (8).

$$i = (e_1 - e_2)(R + j\omega_n L)^{-1} \quad (8)$$

The complex vectors of the induced electromotive forces of the power generators 22 can be associated with the electrical angles $q_1$ and $q_2$ using a constant $k_e$ representing the magnitude of the induced electromotive forces as in the following Equation (9).

$$e_1 = k_e \exp jq_1, e_2 = k_e \exp jq_2 \qquad (9)$$

By using these, the electric output $PG_1$ of the power generator 22A can be represented as in Equation (10). Here, "i*" is a vector formed from a complex conjugate of "i." In addition, this applies similarly to the electric output $PG_2$ of the power generator 22B.

$$P_{G1} = \text{Re}[i^* e_1] \qquad (10)$$
$$= k_e^2 \frac{R(\cos q - 1) + \omega_n L \sin q}{R^2 + \omega_n^2 L^2}$$

In addition, when the electrical angles of the power generators 22A and 22B in a stabilized state are respectively denoted by "$q_{1n}$" and "$q_{2n}$," the spring constant K in the vibration model can be calculated using the following Equation (11).

$$K = -\frac{\partial P_{G1}}{\partial q} \qquad (11)$$
$$= -k_e^2 \frac{R \sin(q_{1n} - q_{2n}) - \omega_n L \cos(q_{1n} - q_{2n})}{R^2 + \omega_n^2 L^2}$$

According to such equations, the output of the power generator at every moment is determined from an electrical angle of the time without any delay. However, actually, there is static capacitance having a small value in a power transmission line N. For this reason, when an induced voltage changes in accordance with a variation in the electrical angle of the power generator 22, a part of a change in the current caused by the changes in the induced voltage is used for charging the static capacitance. For this reason, it takes time until the current reaches a new stabilized state in accordance with a change in the induced voltage. When this delay time is denoted by "$\tau$," electric outputs $P_{G1,dy}$ and $P_{G2,dy}$ of the power generators 22A and 22B with the delay taken into account can be represented using the following Equation (12). In this embodiment, this delay time T is a value that is designated in advance on the basis of the reference angular velocity $\omega_n$ of the power system, values of the resistance R and the inductance L of the power transmission line N and the like.

$$P_{G1,dy} = \frac{1}{\tau s + 1} P_{G1}, \; P_{G2,dy} = \frac{1}{\tau s + 1} P_{G2} \qquad (12)$$

In accordance with this, the spring constant is changed from a constant to a transfer function represented in the following Equation (13). In other words, this Equation (13) represents that the value of the spring constant transiently changes.

$$K_{dy}(s) = K \frac{1}{\tau s + 1} \qquad (13)$$

The effect of this change will be described. By approximating Equation (13) represented above for "$\tau = 0$" using Taylor expansion, the following Equation (14) is acquired.

$$K_{dy}(s) \approx K(1 - \tau s) \qquad (14)$$

By substituting Equation (14) represented above into the vibration model represented in Equation (7), the following Equation (15) is acquired.

$$\tfrac{1}{2} \cdot \omega_n J \ddot{q} + (D - K\tau)\dot{q} + Kq = 0 \qquad (15)$$

In this Equation (15), a term $K_\tau$ of the inductance is subtracted from the damping coefficient D, and thus it is represented to act as a negative damping force. In order to obtain stabilization, the negative damping force should be offset by adding a damping force. In a case in which approximation using Taylor expansion is not performed, the vibration model becomes the following Equation (16).

$$1/2 \cdot \omega_n J \ddot{q} + D\dot{q} + K \frac{1}{\tau s + 1} q = 0 \qquad (16)$$

By adding an additional control input (in other words, a correction value $\Delta P_{dy}$) represented in the following Equation (17) as an output of the turbine apparatus 21, a delay of the output of the power generator 22 is supplemented. In other words, the differential compensating unit 202 calculates a differential signal (the correction value $\Delta P_{dy}$) using the following Equation (17).

$$\Delta P_{dy} = \frac{\tau s}{\tau s + 1} \Delta P_G \qquad (17)$$

From the definition of the spring constant K, the correction value $\Delta P_{dy}$ can be represented using the following Equation (18).

$$\Delta P_{dy} = \frac{\tau s}{\tau s + 1} \Delta P_G \qquad (18)$$
$$\approx -\frac{\tau s}{\tau s + 1} Kq$$

When the correction value $\Delta P_{dy}$ acquired using Equation (18) represented above is added to the right side of Equation (16) as a control input, the vibration model becomes the following Equation (19).

$$1/2 \cdot \omega_n J \ddot{q} + D\dot{q} + K \frac{1}{\tau s + 1} q = -\frac{\tau s}{\tau s + 1} Kq \qquad (19)$$

When terms related to "q" are transitioned to the left side, the following Equation (20) is formed.

$$1/2 \cdot \omega_n J \ddot{q} + D\dot{q} + K \frac{1}{\tau s + 1} q + \frac{\tau s}{\tau s + 1} Kq = 0 \qquad (20)$$

When the terms related to "q" are arranged, Equation (20) represented above becomes the following Equation (21), and the stability is recovered by offsetting the delay.

$$\tfrac{1}{2} \cdot \omega_n J \ddot{q} + D\dot{q} + Kq = 0 \qquad (21)$$

The equation of the control input, in other words, Equation (17) represented above, is a control input that is necessary for recovering the stability. When a value that is more than a necessary value is input, no problem occurs, and there is actually an effect of increasing damping of the power system.

Equation (17) represented above is clearly solved as in the following Equation (22), and thus the same effect can be acquired even when a pseudo differential is changed to a differential in the calculation of a control input. Thus, the differential compensating unit 202 may calculate a differential signal (the correction value $\Delta P_{dy}$) using Equation (22).

$$\Delta P_{dy} = \frac{\tau s}{\tau s + 1} \Delta P_G \approx \tau s P_G \quad (22)$$

In addition, the addition unit 203 of the control apparatus 20 calculates a second adjustment force command value $\Delta P_T$ by adding the first adjustment force command value $\Delta P$ and the correction value $\Delta P_{dy}$. The control apparatus 20 outputs this second adjustment force command value $\Delta P_T$ to the governor V as a final GF adjustment force command (a valve opening degree command).

In a technology of the related art, as disclosed in Patent Document 1, a long-period oscillation is inhibited by disposing a PSS that adjusts a voltage command input from an AVR to a power generator and correcting an output of the power generator. However, the control apparatus 20 according to this embodiment, as described above, calculates a GF adjustment force command including a correction value $\Delta P_{dy}$ used for supplementing an output delay of the power generator 22 and performs output control of the turbine apparatus 21. In accordance with this, the control apparatus 20 can inhibit a long-period oscillation of a power system by employing a simple configuration used for performing output control of the turbine apparatus 21 without using the PSS. Thus, the control apparatus 20 according to this embodiment can omit the PSS, and accordingly, the cost required for the power generation apparatus 2 can be reduced. In addition, in the system of the related art, the output of the turbine apparatus 21 is maintained as it is, and the output of the power generator is corrected by changing a voltage command. For this reason, the correction of the output of the power generator is performed in accordance with variations in the inertial energies of a turbine and a power generator, in other words, variations in the angular velocities. Even in the system of the related art, in the case of a short-period oscillation, the amount of correction of the output of the power generator changes between a positive value and a negative value in a short period, and accordingly, the amplitude of the angular velocity is small, and there is no problem. However, in a long-period oscillation, the amount of correction of the output of the power generator continuously has a positive value or a negative value. As a result, the angular velocities of the turbine and the power generator continuously increase or decrease, and the amplitudes of the angular velocities increase, and accordingly, there is a limit on the amount of correction. In contrast to this, in this embodiment, the output of the turbine is used, and thus a long-period oscillation can be inhibited more strongly.

Second Embodiment

Next, a control apparatus 20 of a power adjustment system 1 according to a second embodiment of the present invention will be described with reference to FIG. 4.

The same reference numerals will be assigned to constituent elements that are common to the first embodiment, and a detailed description will be omitted.

Figure 4:
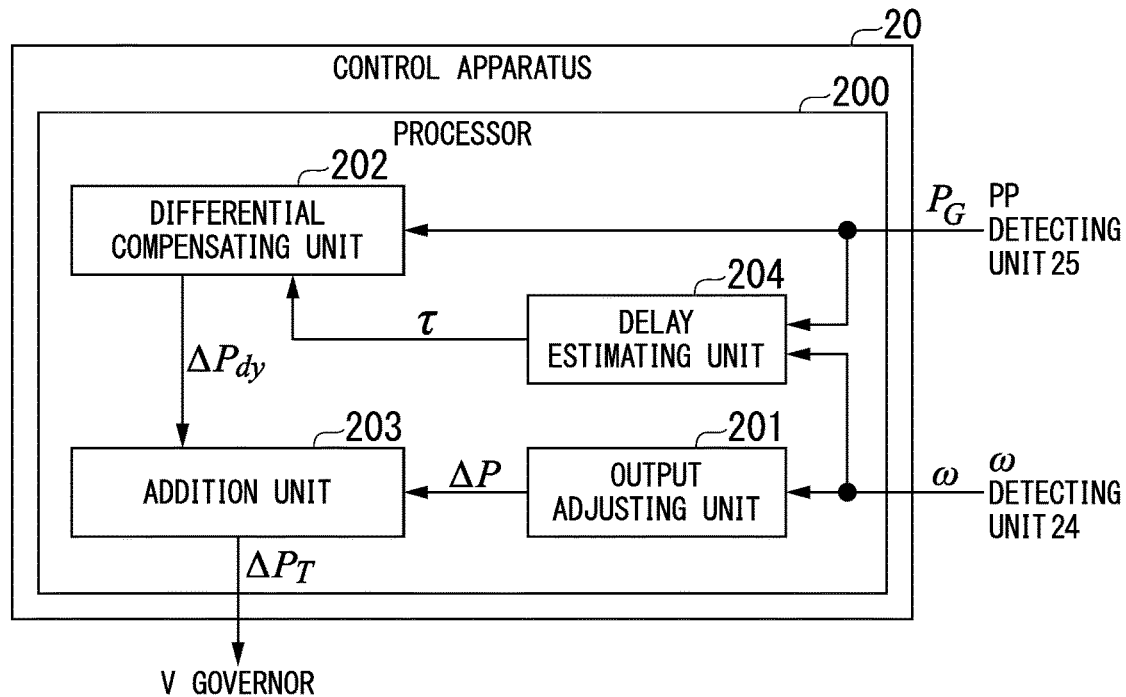
FIG. 4 is a diagram illustrating the functional configuration of a control apparatus according to a second embodiment.

FIG. 4 is a diagram illustrating the functional configuration and the process flow of the control apparatus according to the second embodiment. As illustrated in FIG. 4, the control apparatus 20 according to this embodiment is acquired by adding a function of a delay estimating unit 204 to the control apparatus 20 according to the first embodiment.

The delay estimating unit 204 estimates a response delay time $\tau$ with respect to the electrical angle q of the power generator 22 on the basis of an observed value (angular velocity ω) of the rotation speed of the power generator 22 and an observed value (an electric output $P_G$) of the output. More specifically, the delay estimating unit 204 estimates the response delay time $\tau$, for example, using a least squares method.

In a case in which there is no delay in the electric output of the power generator 22, when a variation in the electric output from a reference point is denoted by "$\Delta P_G$," and a variation in the electrical angle from the reference point is denoted by "$\Delta q$," the following Equation (23) is formed using a spring constant K of a vibration model.

$$\Delta P_G = -K \Delta q \quad (23)$$

Since there is a delay in the actual electric output, the following Equation (24) is formed.

$$\Delta P_{G,dy} = -\frac{K}{\tau s + 1} \Delta q \quad (24)$$

By converting the electrical angle q into an angular velocity ω that can be measured more easily by differentiating both sides of Equation (24) represented above with respect to time, the following Equation (25) is obtained.

$$\Delta \dot{P}_{G,dy} = -\frac{K}{\tau s + 1} \Delta \omega \quad (25)$$

For the simplification of denotation, "$\Delta P_{G,dy}(\bullet)$" will be denoted as "y," "$\Delta \omega$," and "u," and by performing time-differentiation of Equation (25) represented above at a period $\Delta t$ using a backward Euler method, the following difference equation (26) is obtained. In the description here, "$\Delta \dot{P}_{G,dy}(\bullet)$" represents a time differentiation of "$\Delta P_{G,dy}$."

$$K^{-1}(1+\tau \Delta t)y_t - K^{-1}\tau \Delta t y_{t-1} = u_t \quad (26)$$

Vectors representing the following Equation (27) are configured from measured signals y and u. For example, the length of each vector is set to about 100.

$$Y_t = \begin{bmatrix} y_t & y_{t-1} & \cdots & y_{t-100} \\ y_{t-1} & y_{t-2} & \cdots & y_{t-101} \end{bmatrix} \quad (27)$$

$$U_t = [u_t \quad u_{t-1} \quad \cdots \quad u_{t-100}]$$

As represented in the following Equation (28), a value $[a_1 \ a_2]$ is acquired from these vectors.

$$[a_1 a_2] = U_t Y_t^T (Y_t Y_t^T)^{-1} \quad (28)$$

The following Equation (29) is formed for such values $[a_1 \ a_2]$.

$$a_1 = K^{-1}(1+\tau \Delta t)$$

$$a_2 = -K^{-1}\tau \Delta t \quad (29)$$

By solving this for "τ" and "K," the following Equation (30) is obtained.

$$K = \frac{1}{a_1 + a_2} \qquad (30)$$

$$\tau = -\frac{a_2 \Delta t}{a_1 + a_2}$$

The differential compensating unit 202 corrects a differential signal on the basis of the response delay time τ estimated by the delay estimating unit 204. More specifically, the differential compensating unit 202 calculates a corrected differential signal (a correction value $\Delta P_{dy}$) by applying the response delay time τ estimated by the delay estimating unit 204 to Equation (17) or Equation (22) according to the first embodiment.

By correcting the differential signal (the correction value $\Delta P_{dy}$) by estimating the response delay time τ of the power generator 22 in this way, the control apparatus 20 according to this embodiment can perform compensation appropriately even when a delay time of the output of the power generator varies in accordance with a driving state or a transient change. Accordingly, the control apparatus 20 can inhibit oscillations of the power system more effectively.

Third Embodiment

Next, a control apparatus 20 of a power adjustment system 1 according to a third embodiment of the present invention will be described with reference to FIG. 5.

The same reference numerals will be assigned to constituent elements that are common to the first and second embodiments, and a detailed description will be omitted.

Figure 5:
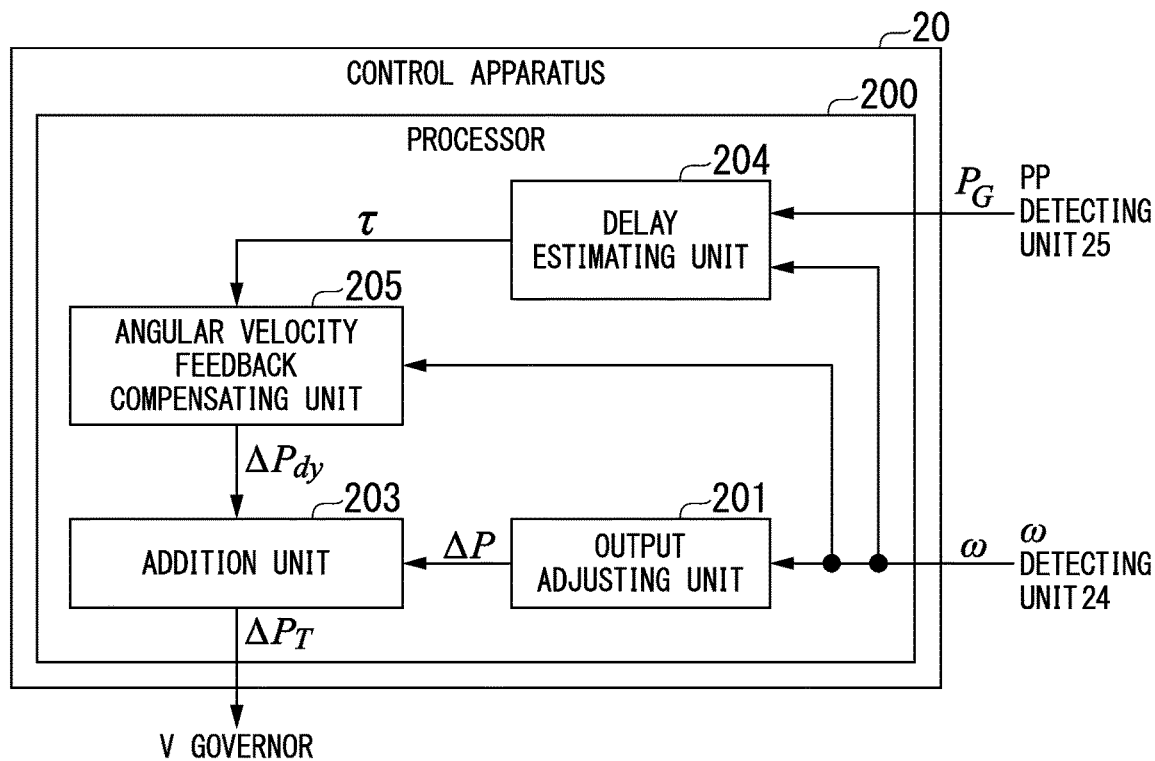
FIG. 5 is a diagram illustrating the functional configuration of a control apparatus according to a third embodiment.

FIG. 5 is a diagram illustrating the functional configuration of the control apparatus according to the third embodiment.

The control apparatus 20 according to this embodiment is acquired by changing a part of the control apparatus 20 according to the second embodiment. More specifically, as illustrated in FIG. 5, the control apparatus 20 according to this embodiment includes an angular velocity feedback compensating unit 205 instead of the differential compensating unit 202.

In the first and second embodiments, the control apparatus 20 uses an electric output Pu of the power generator for the calculation of a control input (the correction value $\Delta P_{dy}$) assuring a delay of the output of the power generator 22 in the differential compensating unit 202. In contrast to this, the control apparatus 20 according to this embodiment calculates a feedback signal (the correction value $\Delta P_{dy}$) of the angular velocity using the angular velocity ω of the power generator 22 by the angular velocity feedback compensating unit 205.

More specifically, the angular velocity feedback compensating unit 205 calculates the correction value $\Delta P_{dy}$ using the following Equation (31) on the basis of the response delay time τ estimated by the delay estimating unit 204 and an observed value (an angular velocity co) of the rotation speed of the power generator 22.

$$\Delta P_{dy} = \frac{\tau s}{\tau s + 1} \Delta P_G \qquad (31)$$

$$\approx -\frac{\tau s}{\tau s + 1} K \Delta q$$

$$= -\frac{\tau}{\tau s + 1} K \Delta \omega$$

In Equation (31) represented above, "Δ" is a value acquired by subtracting a reference value. For example, "Δω" is a value acquired by subtracting a reference angular velocity con from an angular velocity ω.

The correction value $\Delta P_{dy}$ calculated by the angular velocity feedback compensating unit 205 is input to the addition unit 203. Then, the addition unit 203, similar to the first embodiment, calculates a second adjustment force command value $\Delta P_T$ by adding a first adjustment force command value $\Delta P$ and the correction value $\Delta P_{dy}$.

The control apparatus 20 according to this embodiment calculates a correction value $\Delta P_{dy}$ on the basis of an angular velocity ω of the power generator 22 and the response delay time τ by using the angular velocity feedback compensating unit 205, whereby effects similar to those of the first and second embodiments can be acquired. In addition, a GF adjustment force command (a valve opening degree command) is calculated on the basis of the angular velocity ω of the power generator 22. The control apparatus 20 according to this embodiment has a practical availability that the correction value $\Delta P_{dy}$ can also be calculated on the basis of the angular velocity ω.

Fourth Embodiment

Next, a control apparatus 20 of a power adjustment system 1 according to a fourth embodiment of the present invention will be described with reference to FIG. 6.

The same reference numerals will be assigned to constituent elements that are common to the first to third embodiments, and a detailed description will be omitted.

Figure 6:
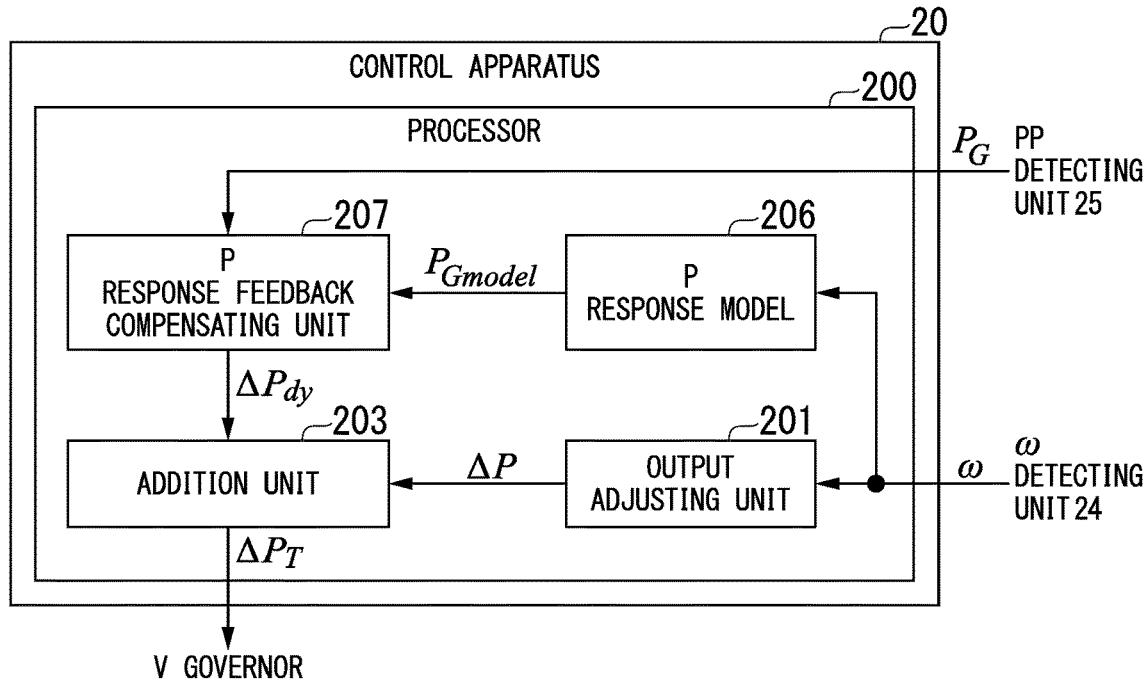
FIG. 6 is a diagram illustrating the functional configuration of a control apparatus according to a fourth embodiment.

FIG. 6 is a diagram illustrating the functional configuration of the control apparatus according to the fourth embodiment.

The control apparatus 20 according to this embodiment is acquired by changing a part of the control apparatus 20 according to each of the first to third embodiments. More specifically, as illustrated in FIG. 6, the control apparatus 20 according to this embodiment includes a P response model 206 and a P response feedback compensating unit 207 instead of the differential compensating unit 202, the delay estimating unit 204, and the angular velocity feedback compensating unit 205.

The P response model 206 predicts a response $P_{Gmodel}$ of the electric output in an ideal state in which there is no delay of a power generator 22 on the basis of an observed value (an angular velocity ω) of the rotation speed of the power generator 22.

The P response feedback compensating unit 207 calculates a correction value $\Delta P_{dy}$ from a deviation between an observed value of the electric output (an actual electric output Pu) of the power generator 22 and the response $P_{Gmodel}$ of the electric output of the power generator 22 predicted by the P response model 206.

More specifically, when a deviation from a reference value of the response $P_{Gmodel}$ predicted by the P response model 206 is denoted by $\Delta P_{Gmodel}$, for example, the deviation can be represented as in the following Equation (32).

$$\Delta P_{Gmodel} = -K \Delta q \qquad (32)$$

In addition, in order to substitute a phase (an electrical angle) q with an angular velocity ω that can be easily measured, by differentiating both sides of this Equation (32), the following Equation (33) is obtained.

$$\Delta \dot{P}_{Gmodel} = -K\Delta\omega \quad (33)$$

The P response feedback compensating unit 207 calculates a correction value $\Delta P_{dy}$, for example, using the following Equation (34).

$$\Delta P_{dy} = \frac{k_p}{\frac{T_L}{2\pi}s + 1}(\Delta \dot{P}_{Gmodel} - \dot{P}_G) \quad (34)$$

$$= \frac{k_p}{\frac{T_L}{2\pi}s + 1}(-K\Delta\omega - \dot{P}_G)$$

In Equation (34), "$k_p$" is a proportionality coefficient of control, and "$T_L$" is a lower limit value of a period of a target long-period oscillation. For example, when the lower limit value is two seconds, "2" is set to "$T_L$." "$\Delta\omega$" is a value acquired by subtracting a reference angular velocity ωn from the angular velocity ω. Since the reference value of "$P_G(\bullet)$" is zero, "$\dot{P}_G(\bullet) = \Delta \dot{P}_G(\bullet)$." In the description presented here, "$\Delta \dot{P}_G(\bullet)$" represents a differential of "$\Delta P_G$."

The control apparatus 20 according to the first embodiment uses a value designated in advance as the delay time τ. In addition, the control apparatuses 20 according to the second and third embodiments estimate a response delay time r using the delay estimating unit 204. In contrast to this, the control apparatus 20 according to this embodiment can perform compensation without setting the delay time τ. For this reason, the configuration can be simplified more than that of each of the embodiments described above.

Fifth Embodiment

Next, a control apparatus 20 of a power adjustment system 1 according to a fifth embodiment of the present invention will be described with reference to FIG. 7.

The same reference numerals will be assigned to constituent elements that are common to the first to fourth embodiments, and a detailed description will be omitted.

Figure 7:
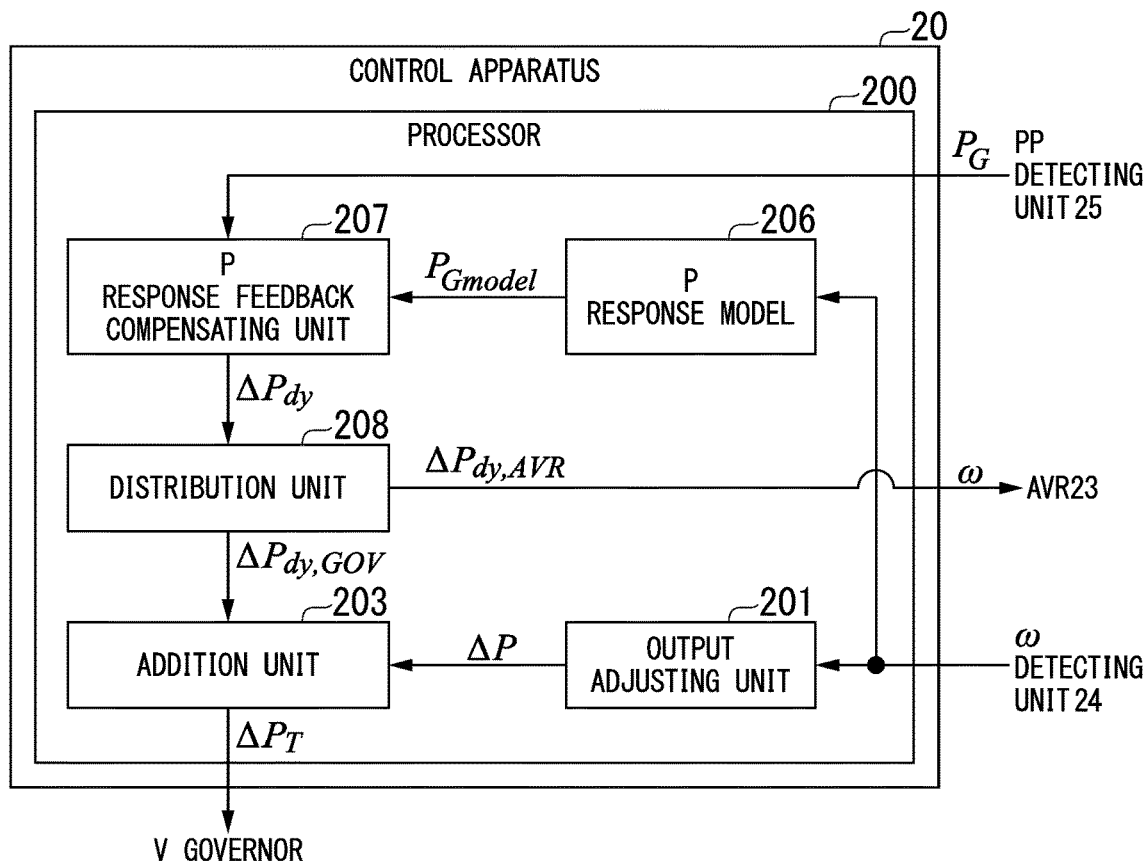
FIG. 7 is a diagram illustrating the functional configuration of a control apparatus according to a fifth embodiment.

FIG. 7 is a diagram illustrating the functional configuration of the control apparatus according to the fifth embodiment.

The control apparatus 20 according to this embodiment is acquired by changing a part of the control apparatus 20 according to the fourth embodiment. More specifically, as illustrated in FIG. 7, the control apparatus 20 further includes a distribution unit 208.

The distribution unit 208 distributes and outputs a correction value $\Delta P_{dy}$ calculated by the P response feedback compensating unit 207 to an addition unit 203 and an AVR 23 that adjusts an output voltage of a power generator 22.

A governor V includes a mechanical element such as a flow control valve. In contrast to this, the AVR 23 is configured of electronic elements and does not include any mechanical elements and thus has a quick response. For this reason, the distribution unit 208 separates a high-frequency component from a control input (a correction value $\Delta P_{dy}$) calculated by a P response feedback compensating unit 207 through filtering, distributes the separated high-frequency component to the AVR 23 as an AVR correction value, and distributes the remainder to an addition unit 203 as a GF correction value for the governor V.

When a control input (an AVR correction value) distributed to the AVR 23 is denoted by "$\Delta P_{dy,AVR}$," the filtering is performed, for example, using the following Equation (35).

$$\Delta P_{dy,AVR} = \frac{s}{s + \omega_{AVR}} \Delta P_{dy} \quad (35)$$

When a control input (a GF correction value) distributed for the governor V is denoted by "$\Delta P_{dy,GOV}$," for example, the following Equation (36) is formed.

$$\Delta P_{dy,GOV} = \Delta P_{dy} - \Delta P_{dy,AVR} \quad (36)$$

An actual form of a command value (a voltage correction value) input to the AVR 23 is a voltage. The conversion from "$\Delta P_{dy,AVR}$" to "$\Delta V_{dy,AVR}$" that is a voltage correction value is performed, for example, using the following Equation (37).

$$\Delta V_{dy,AVR} = \frac{V_n}{P_{Gn}} \Delta P_{dy,AVR} \quad (37)$$

In Equation (37) represented above, "$V_n$" is a voltage command value in a rated output state. "$P_{Gn}$" is a rated output [W] of a power generation apparatus 2. In addition, the distribution unit 208 may output a correction value $\Delta P_{dy,AVR}$ before conversion to the AVR 23 as an AVR correction value and may output a voltage correction value $\Delta V_{dy,AVR}$ after conversion to the AVR 23 as an AVR correction value. In a case in which the distribution unit 208 outputs the AVR correction value $\Delta P_{dy,AVR}$ before conversion to the AVR 23, the conversion into the voltage correction value $\Delta V_{dy,AVR}$ is performed by the AVR 23.

In addition, the AVR 23 calculates an AVR command (a voltage command value) on the basis of a deviation between an output voltage of the power generator 22 measured through an instrument transformer PT and a reference voltage set in advance. The AVR 23 adjusts a field current supplied to the power generator 22 on the basis of a voltage command value after correction acquired by adding this voltage command value and an AVR correction value (voltage correction value) input from the control apparatus 20. In this way, the AVR 23 performs control such that an output voltage of the power generator 22 coincides with the reference voltage. This voltage command value may be calculated by an apparatus other than the AVR 23 (for example, a PSS disposed for inhibiting a short-period oscillation or the like).

In the first to fourth embodiments described above, the control apparatus 20 compensates for a delay of the electric output of the power generator 22 using the GF adjustment force command of the turbine apparatus 21. In contrast to this, the control apparatus 20 according to this embodiment compensates for a delay of the electric output of the power generator 22 using an induced voltage of the power generator 22. More specifically, the control apparatus 20 predicts an ideal power generator output from the angular velocity ω of the power generator 22 using the P response model 206 and compensates for the AVR command on the basis of a deviation between the predicted value ($P_{Gmodel}$) and an actual value ($P_G$). In this way, the control apparatus 20 can inhibit a long-period oscillation by reducing a delay of the electric output of the power generator 22.

Sixth Embodiment

Next, a control apparatus 20 of a power adjustment system 1 according to a sixth embodiment of the present invention will be described with reference to FIGS. 8 and 9.

The same reference numerals will be assigned to constituent elements that are common to the first to fifth embodiments, and a detailed description will be omitted.

Figure 8:
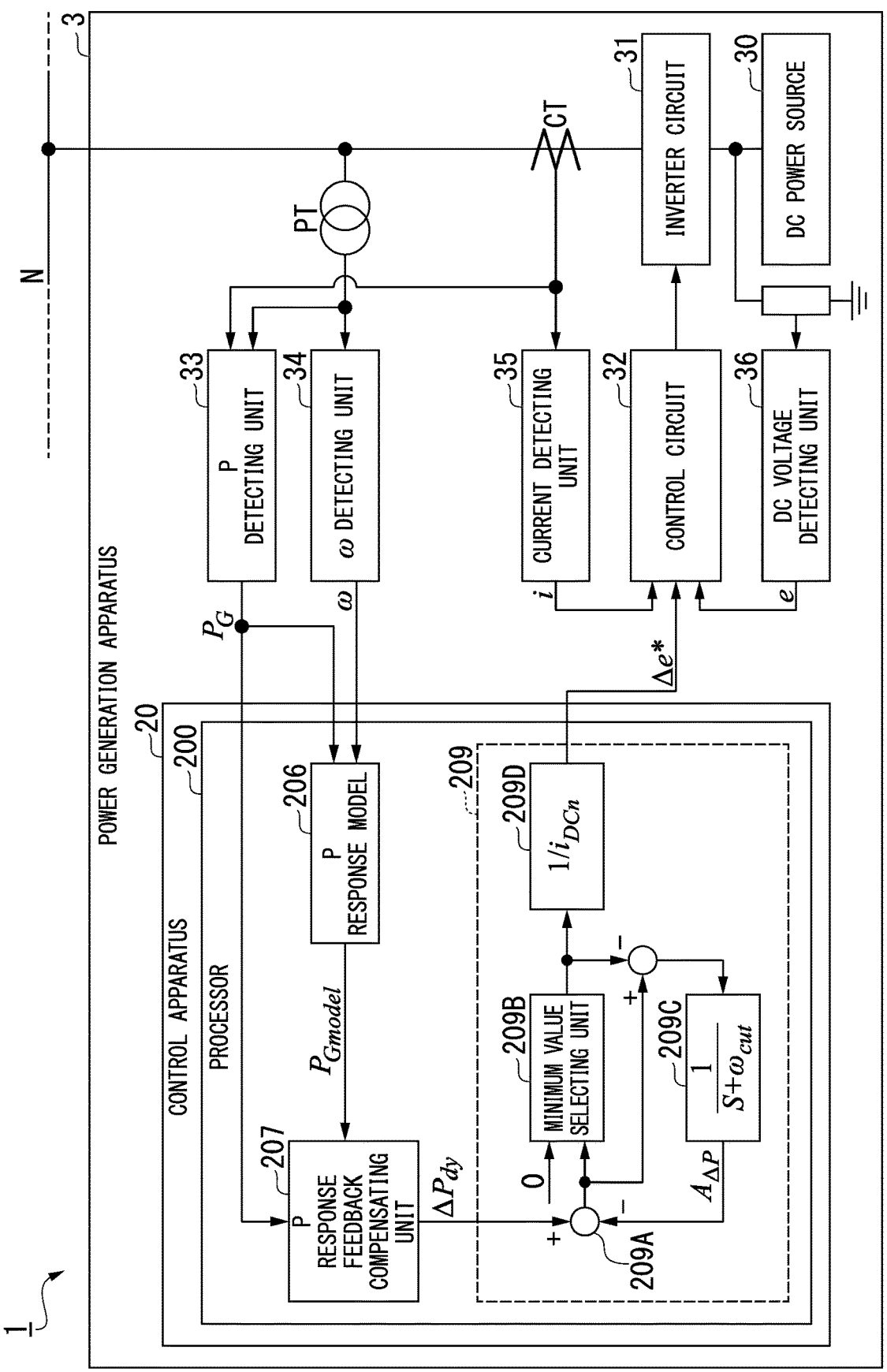
FIG. 8 is a diagram illustrating the functional configuration of a power generation apparatus and a control apparatus according to a sixth embodiment.

FIG. 8 is a diagram illustrating the functional configuration of a power generation apparatus and a control apparatus according to a sixth embodiment.

As illustrated in FIG. 8, the power adjustment system 1 according to this embodiment adjusts electric power supplied to a power system using a solar power generation apparatus 3. The solar power generation apparatus 3 includes a control apparatus 20, a solar cell (a DC power source) 30, an inverter circuit 31, and a control circuit 32.

The solar power generation apparatus 3 is an apparatus that converts solar energy into electric power using the solar cell 30 and supplies the converted electric power. The electric power generated by the solar cell 30 is DC power and thus, as illustrated in FIG. 8, the solar cell 30 is also referred to as a "DC power source." In a case in which the electric power of the solar cell 30 is supplied to a power system, it is necessary to convert the DC power into AC power using the inverter circuit 31. The electric power generated by the solar cell 30 has a property of being dependent on a DC voltage. By using such a property, the solar power generation apparatus 3 performs maximum power point tracking (MPPT) control using the control circuit 32 such that solar energy is efficiently converted into electric power, and the electric power is extracted.

Figure 9:
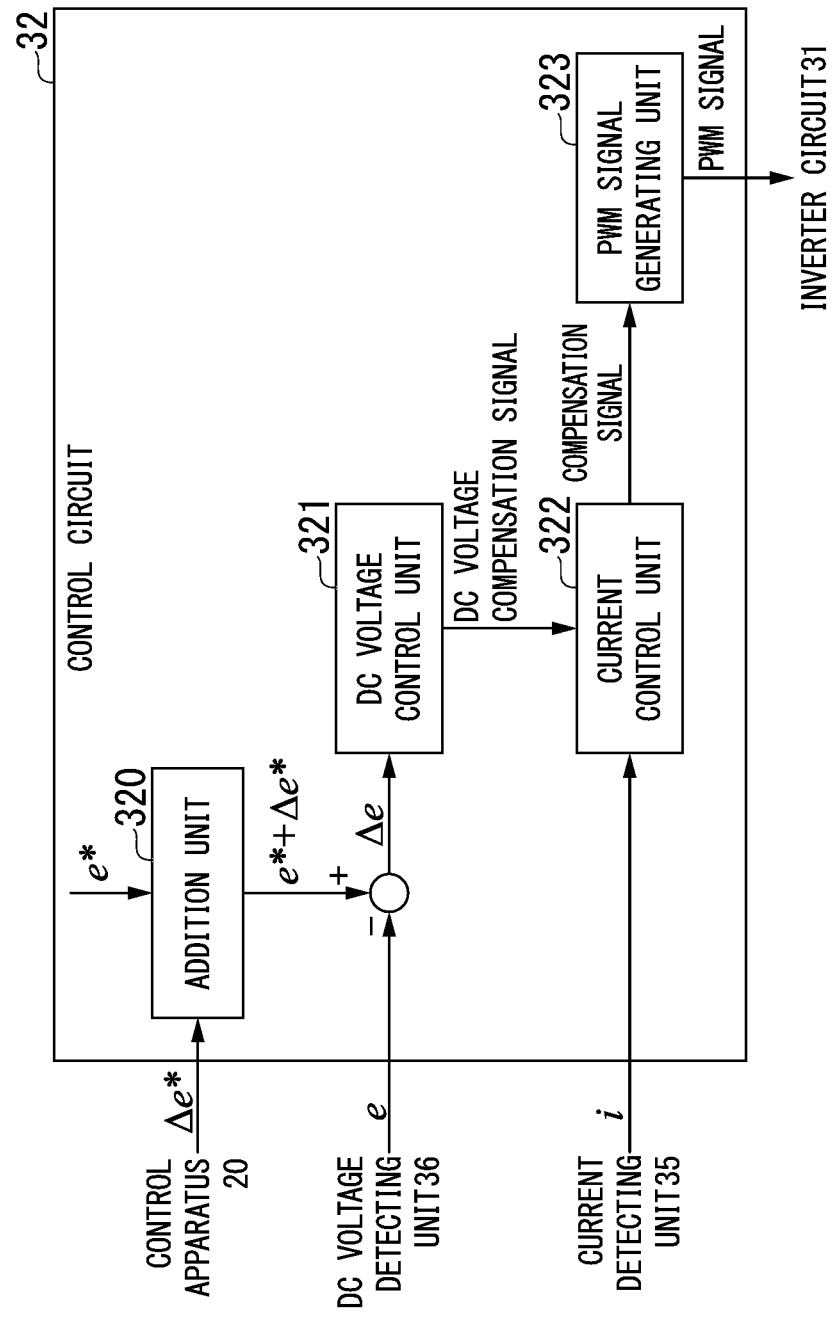
FIG. 9 is a diagram illustrating the functional configuration of a control circuit of the power generation apparatus according to the sixth embodiment.

FIG. 9 is a diagram illustrating the functional configuration of the control circuit of the power generation apparatus according to the sixth embodiment.

The MPPT control involves performing control of a DC voltage such that output active power becomes a maximum. More specifically, as illustrated in FIG. 9, the control circuit 32 minutely changes a DC voltage target value e* such that active power output from the solar cell 30 becomes a maximum. Thus, it is difficult to further increase the active power output by the solar power generation apparatus 3.

The control circuit 32, as illustrated in FIG. 9, includes an addition unit 320, a DC voltage control unit 321, a current control unit 322, and a PWM signal generating unit 323.

The addition unit 320 adds a DC voltage correction value $\Delta e^*$ output from the control apparatus 20 to be described below to the DC voltage target value e* and outputs a target value after correction $e^*+\Delta e^*$.

The DC voltage control unit 321 controls an input voltage of the inverter circuit 31. The DC voltage control unit 321 accepts an input of a deviation $\Delta e$ ($=e^*+\Delta e^*-e$) between a DC voltage signal e output from a DC voltage detecting unit 36 and a target value after correction $e^*+\Delta e^*$ adjusted by the addition unit 320. The DC voltage control unit 321, for example, performs proportional integral control (PI control) and outputs a DC voltage compensation signal used for causing the deviation to be zero.

The current control unit 322 generates a compensation signal on the basis of a current signal i input from a current detecting unit 35 and outputs the generated compensation signal to the PWM signal generating unit 323. In this way, the output current of the inverter circuit 31 is controlled.

The PWM signal generating unit 323 generates a PWM signal used for generating an output voltage waveform of the inverter circuit 31 on the basis of a compensation signal input from the current control unit 322.

The control apparatus 20 according to this embodiment is acquired by changing a part of the control apparatus 20 according to the fourth embodiment. More specifically, the control apparatus 20 according to this embodiment, as illustrated in FIG. 8, includes a P response model 206, a P response feedback compensating unit 207, and a first correction value calculating unit 209. The P response model 206 acquires active power $P_G$ output from the inverter circuit 31 to a power transmission line N and an angular velocity $\omega$ thereof through a P detecting unit 33 and an $\omega$ detecting unit 34 and predicts a response $P_{Gmodel}$ of the electric output in an ideal state of the solar cell 30 on the basis of these. The P response feedback compensating unit 207 calculates a correction value $\Delta P_{dy}$ from a deviation between the active power $P_G$ and the response $P_{Gmodel}$ of the electric output of the solar cell 30 that is predicted by the P response model 206.

The calculation of the DC voltage correction value $\Delta e^*$ that is performed by the first correction value calculating unit 209 will be described here. First, a correction value $\Delta P_{dy}$ that is a control input is input from the P response feedback compensating unit 207 to a calculation unit 209A. The calculation unit 209A subtracts an amplitude $A_{\Delta P}$ of the correction value $\Delta P_{dy}$ to be described below from the correction value $\Delta P_{dy}$ of a GF adjustment force command value and biases the variation center of the correction value $\Delta P_{dy}$ to a negative side by the amplitude. Because of this, "$\Delta P_{dy} - A_{\Delta P}$" generally has a negative value.

Next, a minimum value selecting unit 209B compares "$\Delta P_{dy}-A_{\Delta P}$" with zero such that it reliably becomes a negative value and outputs a minimum value.

When "$\Delta P_{dy}-A_{\Delta P}$" has a positive value according to a transfer function represented in the following Equation (38), an integrator 209C integrates it, thereby estimating an amplitude $A_{\Delta P}$ of the correction value $\Delta P_{dy}$ as a result.

$$\frac{1}{s+\omega_{cut}} \tag{38}$$

In Equation (38) represented above, "$\omega_{cut}$" is a reset ratio of integration. In this way, when the correction value $\Delta P_{dy}$ is stabilized to zero, it is assured that the amplitude $A_{\Delta P}$ is stabilized to zero as well. If "$\omega_{cut}$" is zero, even when the correction value $\Delta P_{dy}$ is corrected to zero, a previous integrated value is maintained in the integrator 209C, and the amplitude $A_{\Delta P}$ does not become zero. "$\omega_{cut}$" is used for avoiding such a state. A long-period oscillation of the power system has a longest period of about 6 seconds. When it is converted into an angular velocity, it is about 1 [rad/s]. In this case, for example, "$\omega_{cut}$" is set to about 0.1 [rad/s] that is 1/10 times an angular velocity corresponding to the longest period. In the control apparatus 20 according to this embodiment, it is essential to reflect the correction value $\Delta P_{dy}$ on the electric power generated by the solar power generation apparatus 3, and the effect does not disappear even when the estimation of the amplitude $A_{\Delta P}$ is removed.

In addition, a minimum value output by the minimum value selecting unit 209B is converted into a DC voltage correction value $\Delta e^*$ by a calculation unit 209D, and the DC voltage correction value is input to the control circuit 32.

As described above, in MPPT control of the related art, a DC voltage is controlled such that output active power becomes a maximum. For this reason, in the technology of the related art, for example, it is difficult to further increase the active power output by the solar power generation apparatus 3 such that it supplements a shortage of the electric power caused by a long-period oscillation. In other words, the solar power generation apparatus 3 does not contribute to the stabilization of a long-period oscillation of the power system.

However, the control apparatus 20 according to this embodiment can maintain a margin for adjusting (increasing or decreasing) the electric power output by the solar power generation apparatus 3 by correcting the DC voltage target value e*. In this way, the control apparatus 20 can also control the solar power generation apparatus 3 such that a long-period oscillation of the power system is inhibited, and accordingly, the power system can be further stabilized.

Seventh Embodiment

Next, a control apparatus 20 of a power adjustment system 1 according to a seventh embodiment of the present invention will be described with reference to FIG. 10.

The same reference numerals will be assigned to constituent elements that are common to the first to sixth embodiments, and a detailed description will be omitted.

Figure 10:
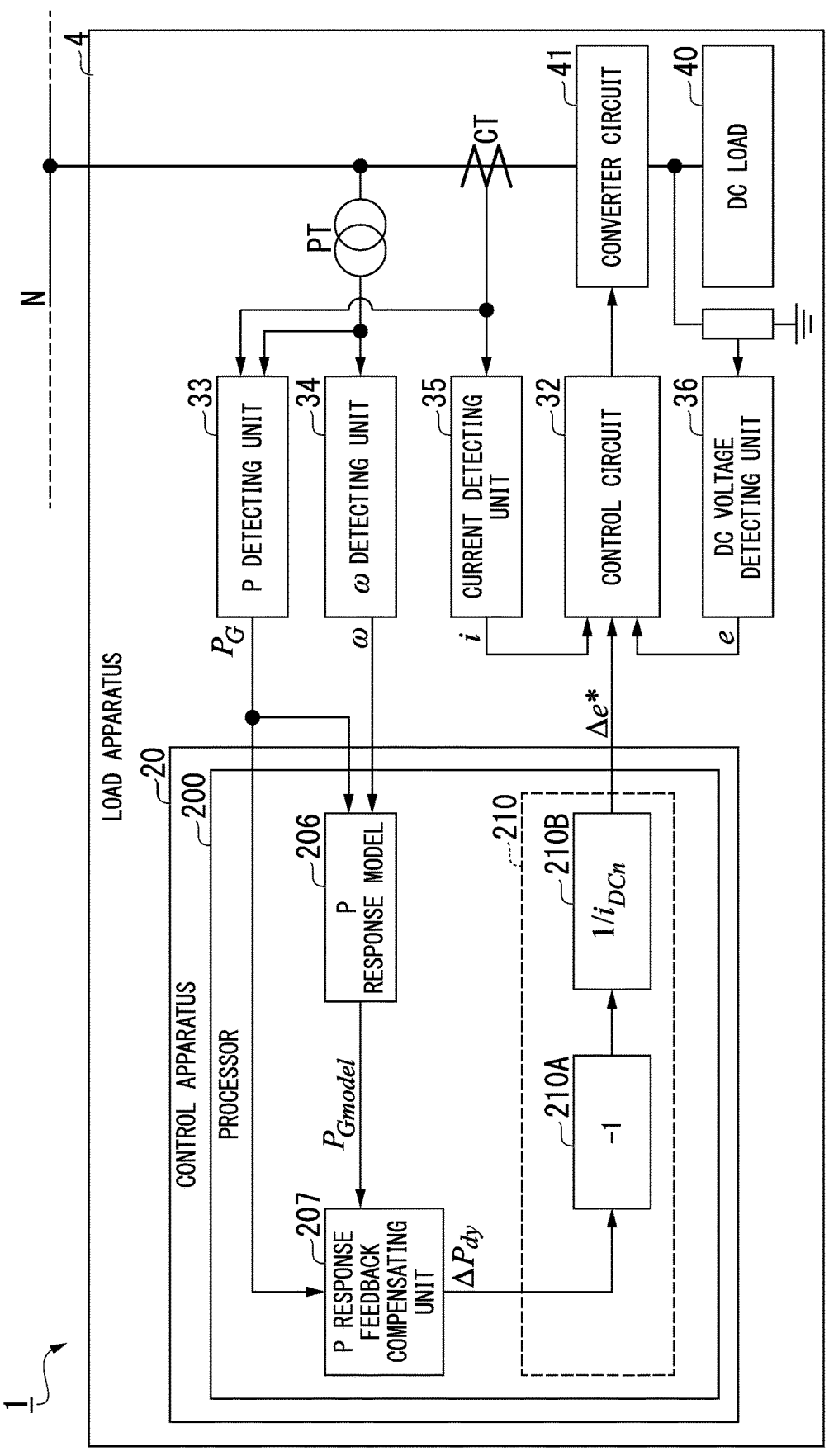
FIG. 10 is a diagram illustrating the functional configuration of a load apparatus and a control apparatus according to a seventh embodiment.

FIG. 10 is a diagram illustrating the functional configuration of a load apparatus and a control apparatus according to a seventh embodiment. As illustrated in FIG. 10, the power adjustment system 1 according to this embodiment adjusts electric power supplied to the load apparatus 4. The load apparatus 4 includes a control apparatus 20, a DC load 40, a converter circuit 41, and a control circuit 32.

The DC load 40, for example, is a storage battery or the like. In a case in which electric power is supplied to the DC load 40 (the storage battery is charged), the converter circuit 41 converts AC power received from a power system into DC power and inputs the converted DC power to the DC load 40.

The control circuit 32 generates various signals used for adjusting electric power input to the DC load 40 on the basis of a target value after correction e*+Δe* that has been adjusted by a DC voltage correction value Δe* output from the control apparatus 20. A specific functional configuration of the control circuit 32 is similar to that of the sixth embodiment.

The control apparatus 20 according to this embodiment is acquired by changing a part of the control apparatus 20 according to the sixth embodiment. More specifically, the control apparatus 20 according to this embodiment, as illustrated in FIG. 10, includes a second correction value calculating unit 210 instead of the first correction value calculating unit 209.

The calculation of a DC voltage correction value Δe" that is performed by the second correction value calculating unit 210 will be described here. First, a correction value $\Delta P_{dy}$ that is a control input is input from a P response feedback compensating unit 207 to a calculation unit 210A. The calculation unit 210A multiplies a correction value $\Delta P_{dy}$ of a GF adjustment force command value by −1. In other words, the calculation unit 210A calculates a correction value of electric power supplied to the load that corresponds to an additional electric output requested by the power system. For example, in a case in which an additional electric output is requested by the power system, the calculation unit 210A calculates a correction value such that it reduces electric power supplied to the DC load 40 in accordance with a correction value $P_{dy}$.

In addition, the correction value calculated by the calculation unit 210A is converted into a DC voltage correction value Δe* by a calculation unit 210B, and the converted DC voltage correction value is input to the control circuit 32.

In this way, the control apparatus 20 according to this embodiment can also use the load apparatus 4 such as a storage battery, which have rapidly become widespread in recent years, for the stabilization of a long-period oscillation of the power system. In this way, the control apparatus 20 can further stabilize the power system.

Eighth Embodiment

Next, a control apparatus 20 of a power adjustment system 1 according to an eighth embodiment of the present invention will be described with reference to FIG. 11.

The same reference numerals will be assigned to constituent elements that are common to the first to seventh embodiments, and a detailed description will be omitted.

Figure 11:
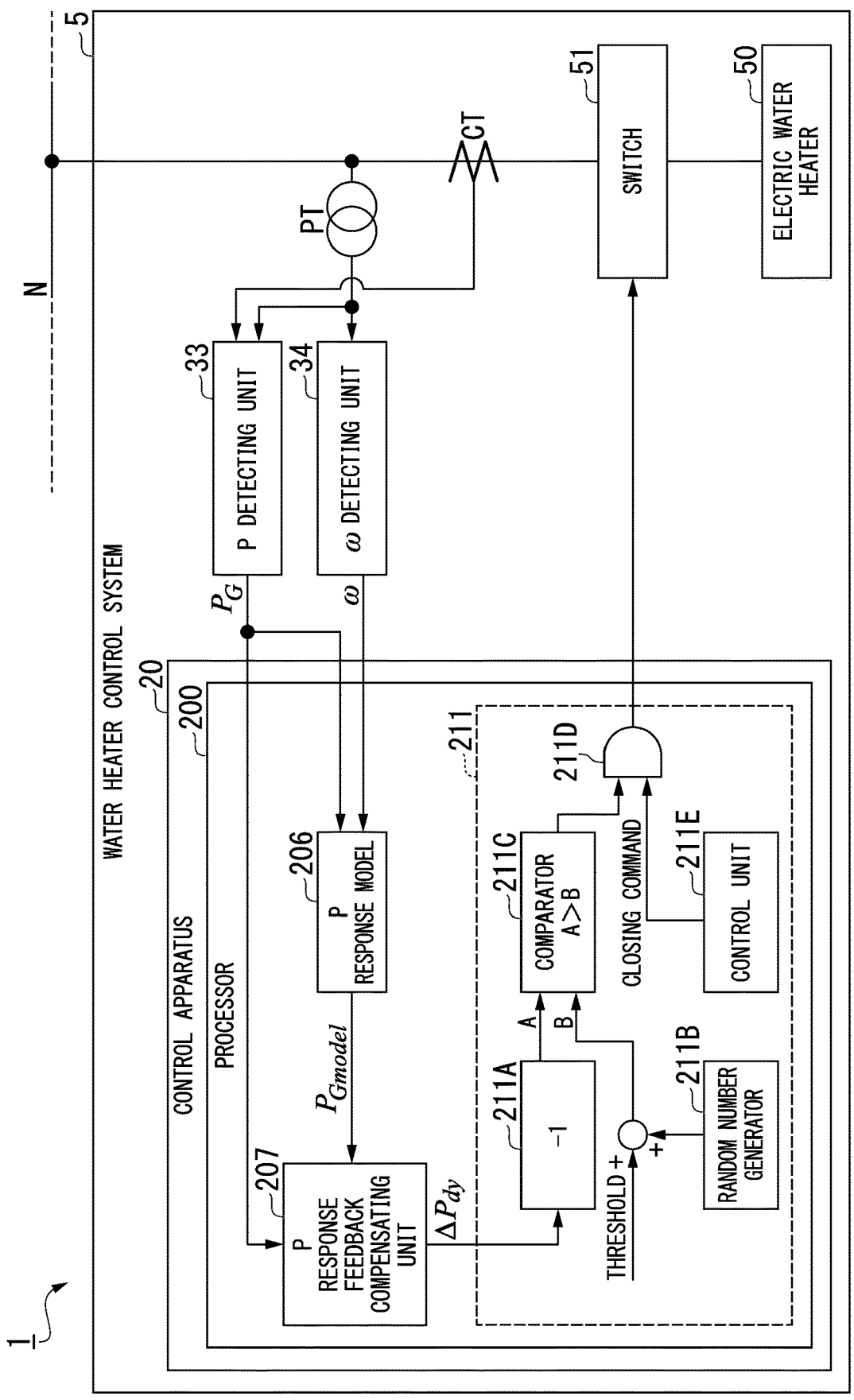
FIG. 11 is a diagram illustrating the functional configuration of a water heater control system and a control apparatus according to an eighth embodiment.

FIG. 11 is a diagram illustrating the functional configuration of a water heater control system and a control apparatus according to the eighth embodiment.

As illustrated in FIG. 11, the power adjustment system 1 according to this embodiment adjusts electric power supplied to the water heater control system 5. The water heater control system 5 includes a control apparatus 20, a plurality of electric water heaters 50 (load apparatuses) and switches 51 corresponding to the plurality of electric water heaters 50. In FIG. 11, for the simplification of description, only one electric water heater 50 among the plurality of electric water heaters and a switch 51 are illustrated.

The control apparatus 20 according to the seventh embodiment described above has the load apparatus 4 that can adjust supplied electric power as its control target. In contrast to this, the electric water heater 50 according to this embodiment only can be either on or off and thus cannot finely adjust an intermediate output. However, this is only for individual electric water heaters 50, and, when the electric water heaters are handled as a group of a plurality of electric water heaters, the output can be finely controlled continuously.

For example, when all the setting values designating on/off timings of the group of electric water heaters are the same, the plurality of electric water heaters 50 become on or off at the same time discontinuously as the whole system. In such a case, it becomes a large disturbance in the power system. In contrast to this, when the on/off setting values of the electric water heaters 50 are gradually set to have different values, the number of electric water heaters 50 that are driven continuously changes, and thus a oscillation in the power system becomes small to be ignorable.

The control apparatus 20 according to this embodiment performs control of the plurality of electric water heaters 50 to be on/off discontinuously in this way. More specifically, the control apparatus 20 performs control to be described below.

The control apparatus 20 according to this embodiment is acquired by changing a part of the control apparatus 20 according to the seventh embodiment. More specifically, the control apparatus 20 according to this embodiment, as illustrated in FIG. 11, includes an opening/closing command generating unit 211 instead of the second correction value calculating unit 210.

The function of the opening/closing command generating unit 211 will be described here. "$\Delta P_{dy}$" that is output from the P response feedback compensating unit 207 is a command for a power source to add an output. The control apparatus 20 according to this embodiment gives commands to the electric water heaters 50 serving as loads, and thus, the calculation unit 211A inverts the positive/negative sign by multiplying the correction value $\Delta P_{dy}$ by −1. A negative value increasing as an absolute value after inversion means that the load is lowered. In other words, the calculation unit 211A calculates a correction value for electric power supplied to the load that corresponds to an additional electric output requested by the power system. When the load is lowered, it is necessary to open the switch 51 for the electric water heater 50. The command for the switch 51 becomes closing when an output of a comparator 211C and a closing command from a control unit 211E such as a timer are input to an AND operation unit 211D, and an "AND" condition is satisfied.

A value A output from the calculation unit 211A is input to the comparator 211C. In addition, a value B acquired by adding a predetermined threshold and a random number generated by a random number generator 211B is input to the comparator 211C. In a case in which the value A is larger than the value B, the comparator 211C outputs a closing command (for example, "1"). On the other hand, in a case in which the value A is equal to or smaller than the value B, the comparator 211C outputs an opening command (for example, "0"). The threshold, for example, is a negative value that does not appear at a normal time. The random number generator 211B, for example, updates the random number irregularly about once per 10 minutes. By updating the random number at a high frequency, drive times of the plurality of electric water heaters 50 are averaged, and thus, a risk of being unable to obtain sufficient heated water during a drive time set by a timer is reduced.

In a case in which closing commands ("1") are input from both the control unit 211E and the comparator 211C, the AND operation unit 211D outputs a closing command to the switch 51. In addition, even in a case in which a closing command ("1") is input from the control unit 211E, when an opening command ("0") is input from the comparator 211C, the AND operation unit 211D outputs an opening command to the switch 51. For this reason, when an additional electric output is requested in a power system, it becomes difficult for the switch 51 to come into a closed state.

In this way, the control apparatus 20 can inhibit the plurality of electric water heaters 50 from becoming on or off at the same time, and accordingly, the power system can be stabilized.

Ninth Embodiment

Next, a power adjustment system 1 according to a ninth embodiment of the present invention will be described with reference to FIG. 12.

The same reference numerals will be assigned to constituent elements that are common to the first to eighth embodiments, and a detailed description will be omitted.

Figure 12:
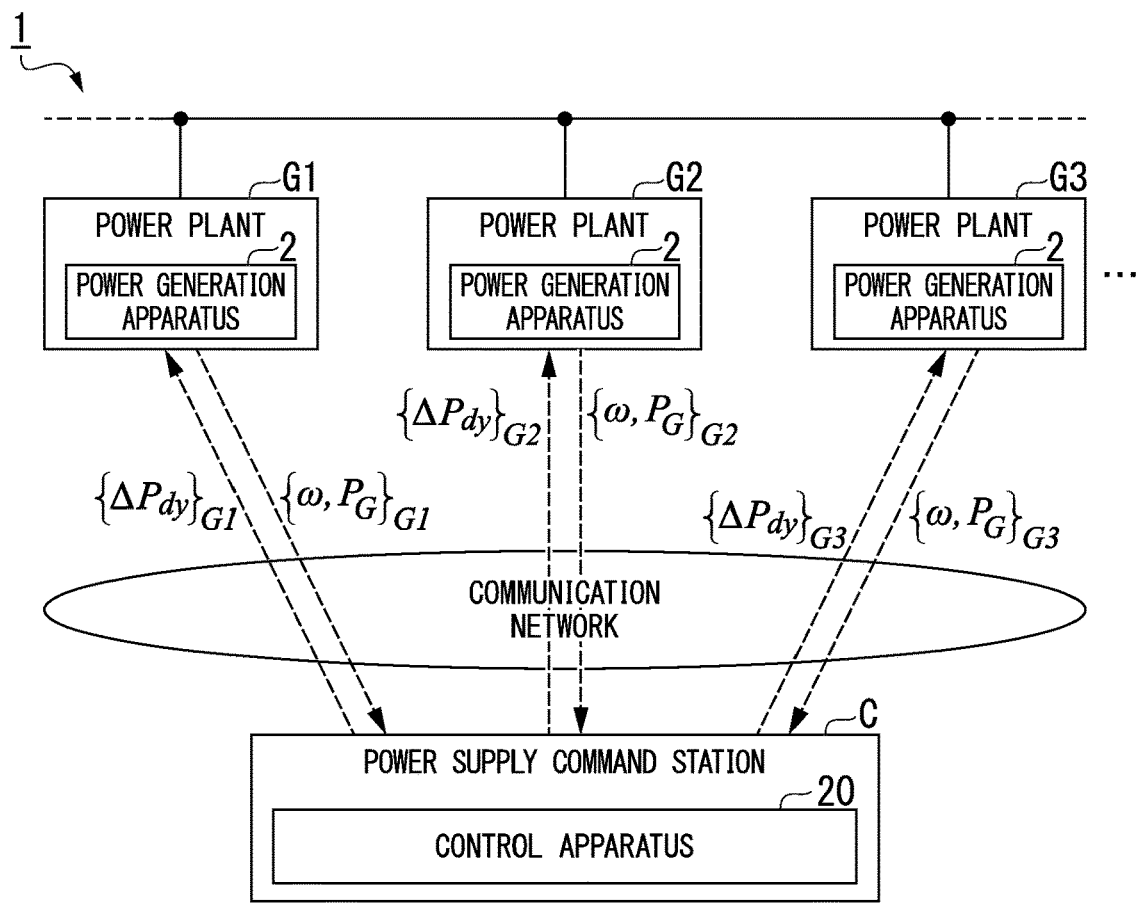
FIG. 12 is a diagram illustrating the entire configuration of a power adjustment system according to a ninth embodiment.

FIG. 12 is a diagram illustrating the entire configuration of the power adjustment system according to the ninth embodiment.

As illustrated in FIG. 12, the power adjustment system 1 according to this embodiment includes a plurality of power plants G1, G2, and G3 and a power supply command station C.

In the first to sixth embodiments described above, a form in which the power generation apparatus 2 (FIG. 1) or the solar power generation apparatus 3 (FIG. 8) includes the control apparatus 20 has been described. In contrast to this, in this embodiment, as illustrated in FIG. 12, a control apparatus 20 is disposed in the power supply command station C. This control apparatus 20 outputs a correction value $\Delta P_{dy}$ for compensating for a delay of the electric output of a power generator 22 to the power generation apparatus 2 of each of the power plants G1 to G3 as a correction command value.

For example, as illustrated in FIG. 12, a power generation apparatus 2 including a turbine apparatus 21 and a power generator 22 is disposed in each of the power plants G1 to G3. The control apparatus 20 acquires active power $P_G$ transmitted from the power generation apparatus 2 of each of the power plants G1 to G3 to the power transmission line N and an angular velocity ω of the power generator 22 through a communication network. In addition, the control apparatus 20 may additionally acquire an output voltage, an output current, a frequency, and the like of the power generation apparatus 2. In addition, the control apparatus 20 calculates correction values $\{\Delta P_{dy}\}_{G1}$, $\{\Delta P_{dy}\}_{G2}$, and $\{\Delta P_{dy}\}_{G3}$ for compensating for the delay of the electric output of the power generator 22 on the basis of the active power $P_G$ and the angular velocity ω acquired from each of the power plants G1 to G3 and outputs the calculated correction values to the power plants G1 to G3 as correction command values. Then, the power generation apparatus 2 of each of the power plants G1 to G3 calculates a second adjustment force command value $\Delta P_T$ acquired by adding the correction command value input from the control apparatus 20 of the power supply command station C to a first adjustment force command value $\Delta P$ calculated using Equation (1) described above. The control apparatus 20 of the power supply command station C calculates the correction values $\{\Delta P_{dy}\}_{G1}$, $\{\Delta P_{dy}\}_{G2}$, and $\{\Delta P_{dy}\}_{G3}$ using the method described in any one of the first to fifth embodiments described above.

A solar power generation apparatus 3 may be disposed in each of the power plants G1 to G3. In such a case, the control apparatus 20 of the power supply command station C calculates the correction values $\{\Delta P_{dy}\}_{G1}$, $\{\Delta P_{dy}\}_{G2}$, and $\{\Delta P_{dy}\}_{G3}$ using the method described in the sixth embodiment above.

The control apparatus 20 of the power supply command station C may be configured to output correction command values to customers such as factories instead of the power plants G1 to G3. In such a case, the control apparatus 20, for example, outputs the DC voltage correction value $\Delta e^*$ calculated using the method described in the seventh embodiment to each customer as a correction command value.

In this way, demand and supply balances for the plurality of power plants G1 to G3 can be efficiently adjusted by the power supply command station C. In addition, for example, in a case in which a setting change or the like is performed, only the control apparatus 20 of the power supply command station C may be corrected, and thus, the mounting flexibility can be improved.

(Hardware Configuration of Control Apparatus)

Figure 13:
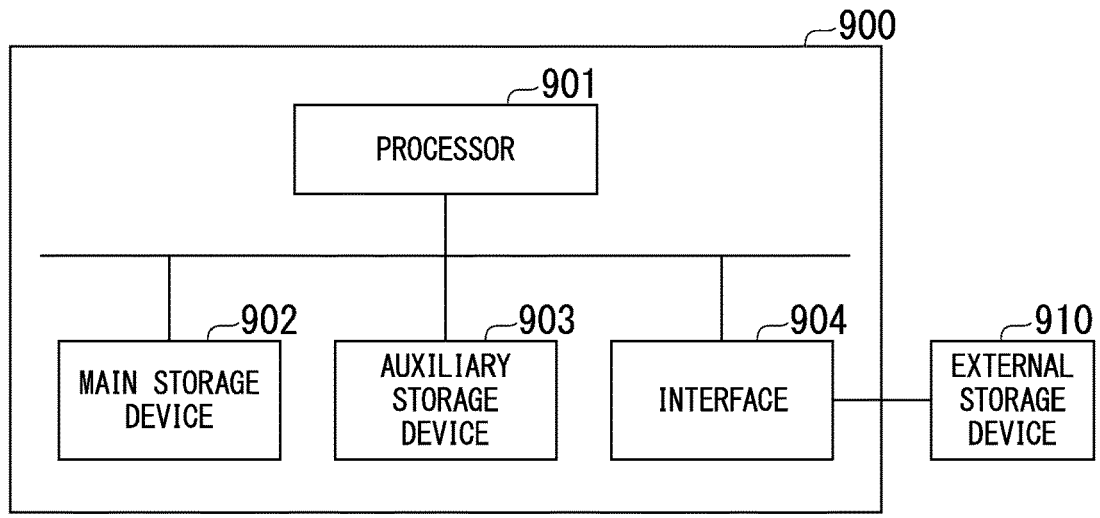
FIG. 13 is a diagram illustrating an example of the hardware configuration of a control apparatus according to any one embodiment.

FIG. 13 is a diagram illustrating an example of the hardware configuration of a control apparatus according to any one embodiment.

Hereinafter, an example of the hardware configuration of the control apparatus 20 will be described with reference to FIG. 13.

As illustrated in FIG. 13, a computer 900 includes a processor 901, a main storage device 902, an auxiliary storage device 903, and an interface 904.

The control apparatus 20 according to any one of the embodiments described above is mounted in the computer 900. The operation of each processing unit described above is stored in the auxiliary storage device 903 in the form of a program. The processor 901 reads the program from the auxiliary storage device 903, expands the program in the main storage device 902, and executes the process described above in accordance with the program. In addition, the processor 901 secures a storage area used by the control apparatus 20 for various processes in the main storage device 902 in accordance with the program. Furthermore, the processor 901 secures a storage area for storing data during processing in the auxiliary storage device 903 in accordance with the program.

The program may be used for realizing some of the functions of the computer 900. For example, the program may realize functions by being combined with another program stored in the auxiliary storage device 903 in advance or being combined with another program mounted in another device. In another embodiment, the computer 900 may include a custom large scale integrated circuit (LSI) such as a programmable logic device (PLD) in addition to the configuration described above or instead of the configuration described above. Examples of the PLD include a programmable array logic (PAL), a generic array logic (GAL), a complex programmable logic device (CPLD), or a field programmable gate array (FPGA). In such a case, some or all of the functions realized by the processor 901 may be realized by the integrated circuit.

As examples of the auxiliary storage device 903, there are a hard disk drive (HDD), a solid state drive (SSD), a magnetic disk, a magneto-optical disk, a compact disc read only memory (CD-ROM), a digital versatile disc read only memory (DVD-ROM), a semiconductor memory, and the like. The auxiliary storage device 903 may be an internal medium that is directly connected to a bus of the computer 900 or an external medium that is connected to the computer 900 through the interface 904 or a communication line. In addition, in a case in which this program is distributed to the computer 900 using a communication line, the computer 900 that has received the distribution may expand the program into the main storage device 902 and execute the process described above. In at least one embodiment, the auxiliary storage device 903 is a non-transitory storage medium.

As above, while several embodiments of the present invention have been described, all these embodiments are presented as examples and are not intended to limit the scope of the invention. Such embodiments can be performed in other various forms, and various omissions, substitutions, and changes may be made in a range not departing from the concept of the invention. Such embodiments and modifications thereof are included in the scope and the concept of the invention, and similarly, they are included in the scope of the invention described in the claims and equivalents thereof.

<Supplementary Note>

The control apparatuses 20 described in the embodiments described above, a method of controlling the power generation apparatus 2, and a non-transitory computer readable medium of the control apparatus 20 are, for example, perceived as below.

According to a first aspect of the present disclosure, there is provided a control apparatus that is configured to control driving of a power generation apparatus including a motor and a power generator, the control apparatus comprising a processor executing: a process of calculating a first adjustment force command value used for controlling the motor in accordance with a deviation between an observed value and a reference value of a rotation speed of the power generator; a process of calculating a correction value for compensating for a delay of an electric output of the power generator; and a process of calculating a second adjustment force command value used for controlling the motor by adding the first adjustment force command value and the correction value.

According to a second aspect of the present disclosure, in the control apparatus according to the first aspect, the processor that is configured to calculate a differential signal acquired by differentiating an observed value of the electric output of the power generator as the correction value in the process of calculating the correction value.

According to a third aspect of the present disclosure, in the control apparatus according to the second aspect, the processor is configured to further execute a process of estimating a response delay time of the power generator on the basis of the observed value of the rotation speed and the observed value of the electric output and is configured to correct the differential signal on the basis of the response delay time in the process of calculating the correction value.

According to a fourth aspect of the present disclosure, in the control apparatus according to the first aspect, the processor is configured to further execute a process of estimating a response delay time of the power generator on the basis of the observed value of the rotation speed and an observed value of the electric output and is configured to calculate the correction value on the basis of the observed value of the rotation speed and the response delay time in the process of calculating the correction value.

According to a fifth aspect of the present disclosure, in the control apparatus according to the first aspect, the processor is configured to further execute a process of predicting a response of the electric output of the power generator on the basis of the observed value of the rotation speed and is configured to calculate the correction value on the basis of a deviation between an observed value of the electric output and the predicted response in the process of calculating the correction value.

According to a sixth aspect of the present disclosure, in the control apparatus according to the fifth aspect, the processor is configured to further execute a process of outputting the calculated correction value to an automatic voltage regulator that is configured to adjust an output voltage of the power generator.

According to a seventh aspect of the present disclosure, there is provided a control apparatus that is configured to control driving of a solar power generation apparatus that performs power generation using a solar cell, the control apparatus comprising a processor executing: a process of predicting a response of an electric output of the solar cell on the basis of observed values of the electric output and an angular frequency of the solar cell; and a process of calculating a correction value used for adjusting a voltage target value of the solar cell on the basis of a deviation between the observed value of the electric output and the predicted response.

According to an eighth aspect of the present disclosure, there is provided a control apparatus that is configured to control driving of a load apparatus to which electric power is supplied from a power system, the control apparatus comprising a processor executing: a process of calculating a correction value for the electric power supplied to the load apparatus that corresponds to the additional electric output requested by the power system; and a process of calculating a correction value used for adjusting a voltage target value of the supplied electric power on the basis of the correction value for the supplied electric power.

According to a ninth aspect of the present disclosure, there is provided a control apparatus that is configured to control on/off of supply of electric power from a power system to a plurality of load apparatuses, the control apparatus comprising a processor executing: a process of calculating a correction value for the electric power supplied to each load apparatus that corresponds to an additional electric output requested by the power system; a process of switching the supply of the electric power to the load apparatus on or off on the basis of the correction value for the supplied electric power and a threshold; and a process of changing the threshold using a random number.

According to a tenth aspect of the present disclosure, there is provided a control apparatus that corrects an adjustment force of a power generation apparatus individually disposed in a plurality of power plants, the control apparatus comprising a processor executing: a process of calculating a correction value for compensating for a delay of an electric output of a power generator included in each of the plurality of power generation apparatuses and for adjusting an output of a motor included in each of the plurality of power generation apparatuses; and a process of outputting the correction value to each of the plurality of power generation apparatuses.

According to an eleventh aspect of the present disclosure, there is provided a control method for controlling driving of a power generation apparatus including a motor and a power generator, the control method comprising: calculating a first adjustment force command value used for controlling the motor in accordance with a deviation between an observed value and a reference value of a rotation speed of the power generator; calculating a correction value for compensating for a delay of an electric output of the power generator; and calculating a second adjustment force command value used for controlling the motor by adding the first adjustment force command value and the correction value.

According to a twelfth aspect of the present disclosure, there is provided a non-transitory computer readable medium storing a program that enables a computer of a control apparatus controlling driving of a power generation apparatus including a motor and a power generator to function, the program causing the computer to execute: a process of calculating a first adjustment force command value used for controlling the motor in accordance with a deviation between an observed value and a reference value of a rotation speed of the power generator; a process of calculating a correction value for compensating for a delay of an electric output of the power generator; and a process of calculating a second adjustment force command value used for controlling the motor by adding the first adjustment force command value and the correction value.

EXPLANATION OF REFERENCES

1 Power adjustment system
2, 2A, 2B, 2C Power generation apparatus
20 Control apparatus
200 Processor
201 Output adjusting unit
202 Differential compensating unit
203 Addition unit
204 Estimating unit
205 Angular velocity feedback compensating unit
206 P response model
207 P response feedback compensating unit
208 Distribution unit
209 First correction value calculating unit
210 Second correction value calculating unit
211 Opening/closing command generating unit
21 Turbine apparatus
22, 22A, 22B Power generator
23 Automatic voltage regulator
24 ω detecting unit
25 P detecting unit
3 Solar power generation apparatus (power generation apparatus)
30 Solar cell (dc power source)
31 Inverter circuit
32 Control circuit
320 Addition unit
321 DC voltage control unit
322 Current control unit
323 PWM signal generating unit
33 P detecting unit
34 ω detecting unit
35 Current detecting unit
36 DC voltage detecting unit
4 Load apparatus
40 DC load
41 Converter circuit
5 Water heater control system
50 Electric water heater
51 Switch

What is claimed is:

1. A control apparatus that is configured to control driving of a power generation apparatus including a motor and a power generator, the control apparatus comprising a processor executing:
    a process of calculating a first adjustment force command value used for controlling the motor in accordance with a deviation between an observed value and a reference value of a rotation speed of the power generator;
    a process of calculating a correction value for compensating for a delay of an electric output of the power generator; and
    a process of calculating a second adjustment force command value used for controlling the motor by adding the first adjustment force command value and the correction value.

2. The control apparatus according to claim 1, wherein the processor is configured to calculate a differential signal acquired by differentiating an observed value of the electric output of the power generator as the correction value in the process of calculating the correction value.

3. The control apparatus according to claim 2, wherein the processor is configured to further execute a process of estimating a response delay time of the power generator on the basis of the observed value of the rotation speed and the observed value of the electric output and is configured to correct the differential signal on the basis of the response delay time in the process of calculating the correction value.

4. The control apparatus according to claim 1, wherein the processor is configured to further execute a process of estimating a response delay time of the power generator on the basis of the observed value of the rotation speed and an observed value of the electric output and is configured to calculate the correction value on the basis of the observed value of the rotation speed and the response delay time in the process of calculating the correction value.

5. The control apparatus according to claim 1, wherein the processor is configured to further execute a process of predicting a response of the electric output of the power generator on the basis of the observed value of the rotation speed and is configured to calculate the correction value on the basis of a deviation between an observed value of the electric output and the predicted response in the process of calculating the correction value.

6. The control apparatus according to claim 5, wherein the processor is configured to further execute a process of outputting the calculated correction value to an automatic voltage regulator that is configured to adjust an output voltage of the power generator.

7. A control method for controlling driving of a power generation apparatus including a motor and a power generator, the control method comprising:
- calculating a first adjustment force command value used for controlling the motor in accordance with a deviation between an observed value and a reference value of a rotation speed of the power generator;
- calculating a correction value for compensating for a delay of an electric output of the power generator; and
- calculating a second adjustment force command value used for controlling the motor by adding the first adjustment force command value and the correction value.

8. A non-transitory computer readable medium storing a program that enables a computer of a control apparatus controlling driving of a power generation apparatus including a motor and a power generator to function, the program causing the computer to execute:
- a process of calculating a first adjustment force command value used for controlling the motor in accordance with a deviation between an observed value and a reference value of a rotation speed of the power generator;
- a process of calculating a correction value for compensating for a delay of an electric output of the power generator; and
- a process of calculating a second adjustment force command value used for controlling the motor by adding the first adjustment force command value and the correction value.

* * * * *